March 26, 1935. H. L. WETHERBEE 1,995,727
VALVE FOR HOT GAS MAINS
Filed Dec. 4, 1931 5 Sheets-Sheet 1
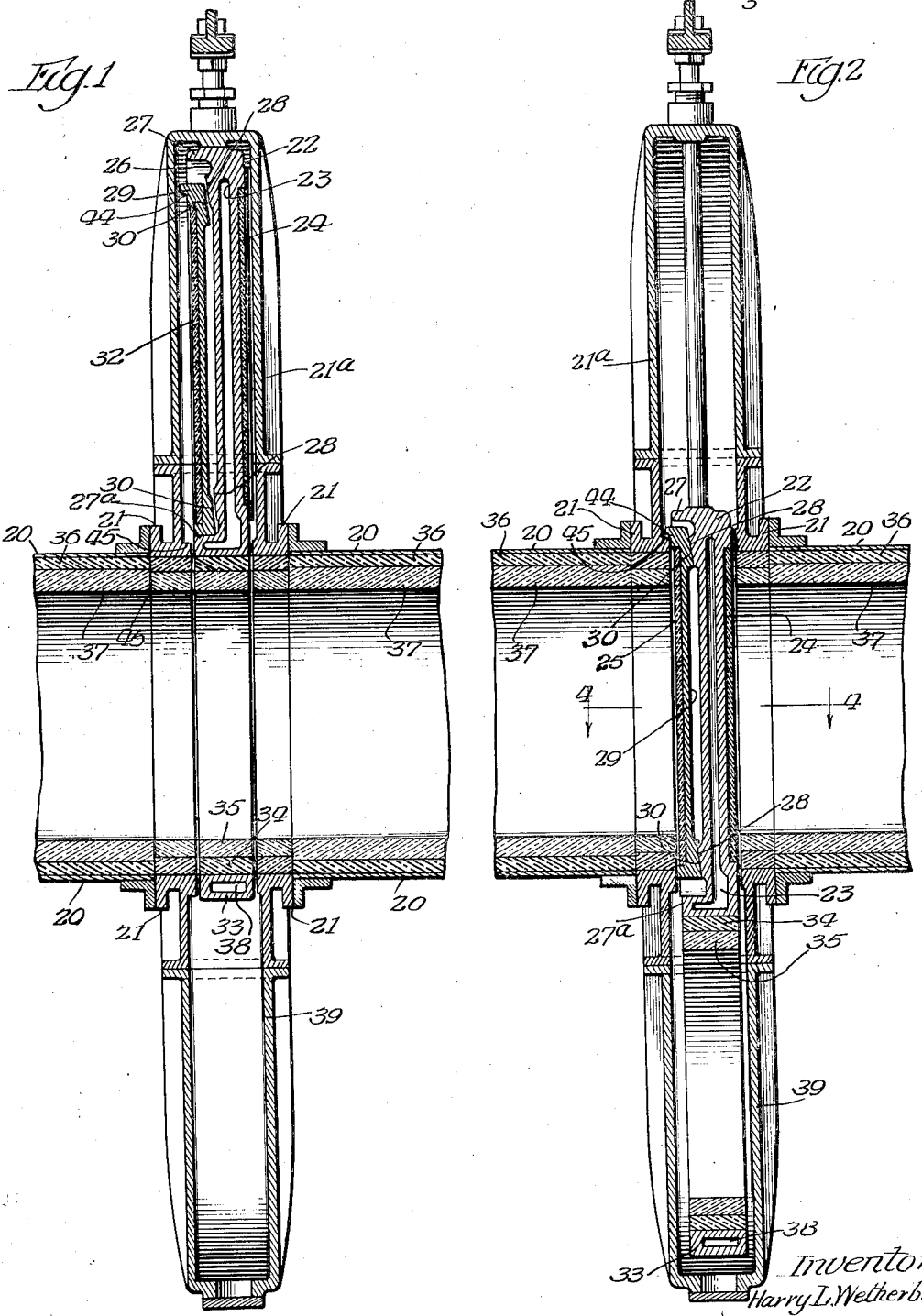
Inventor
Harry L. Wetherbee
By
Atty.

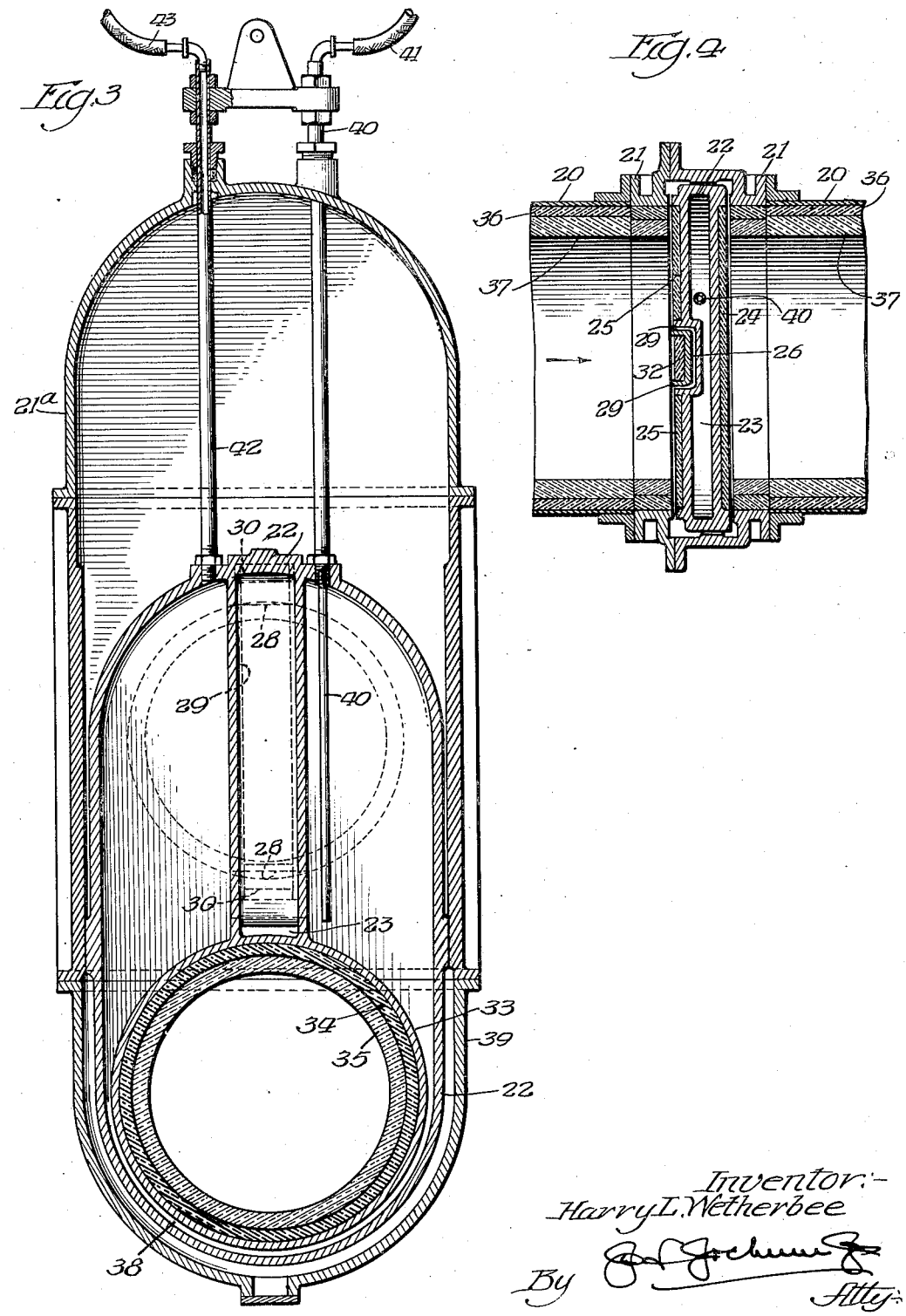

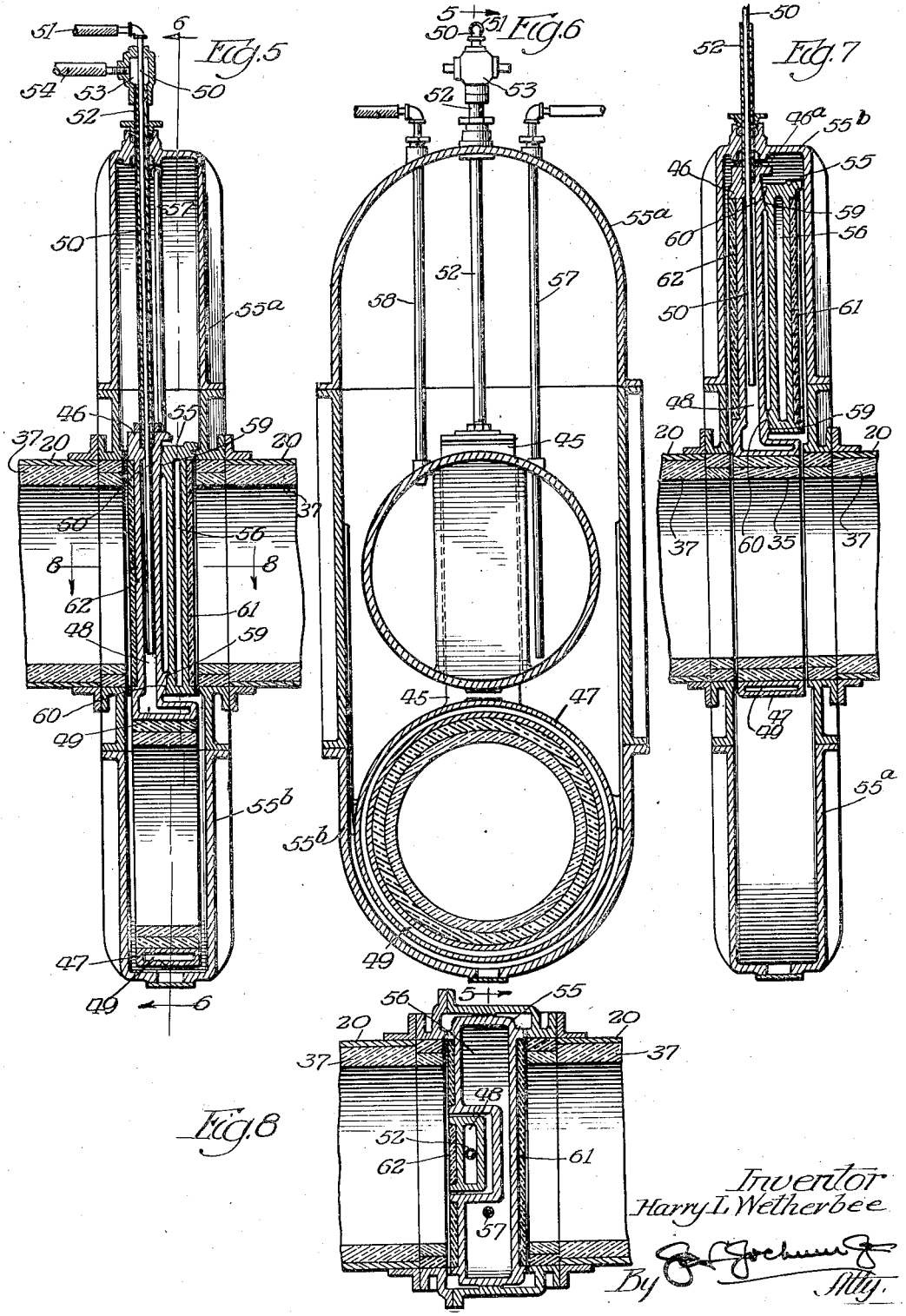

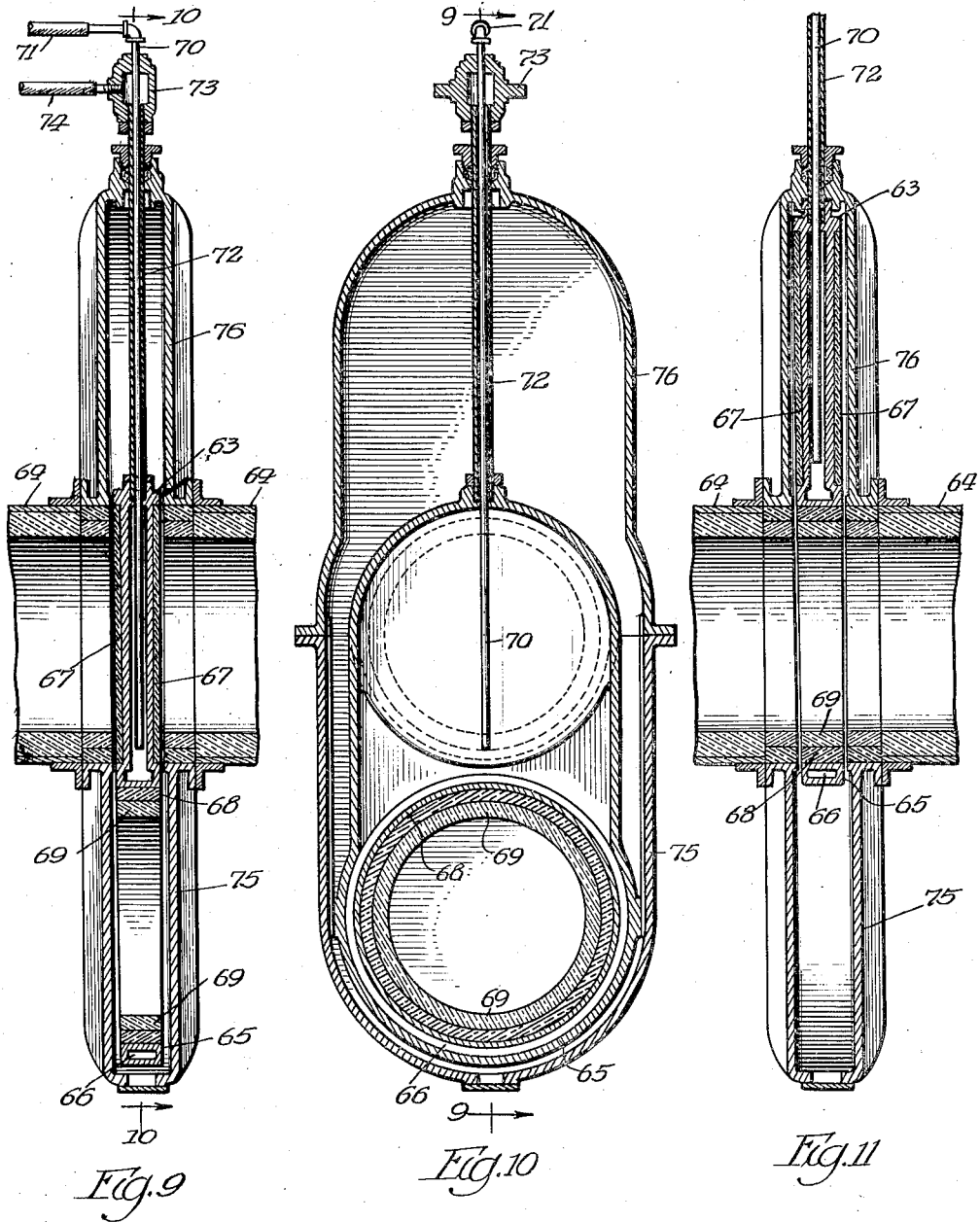

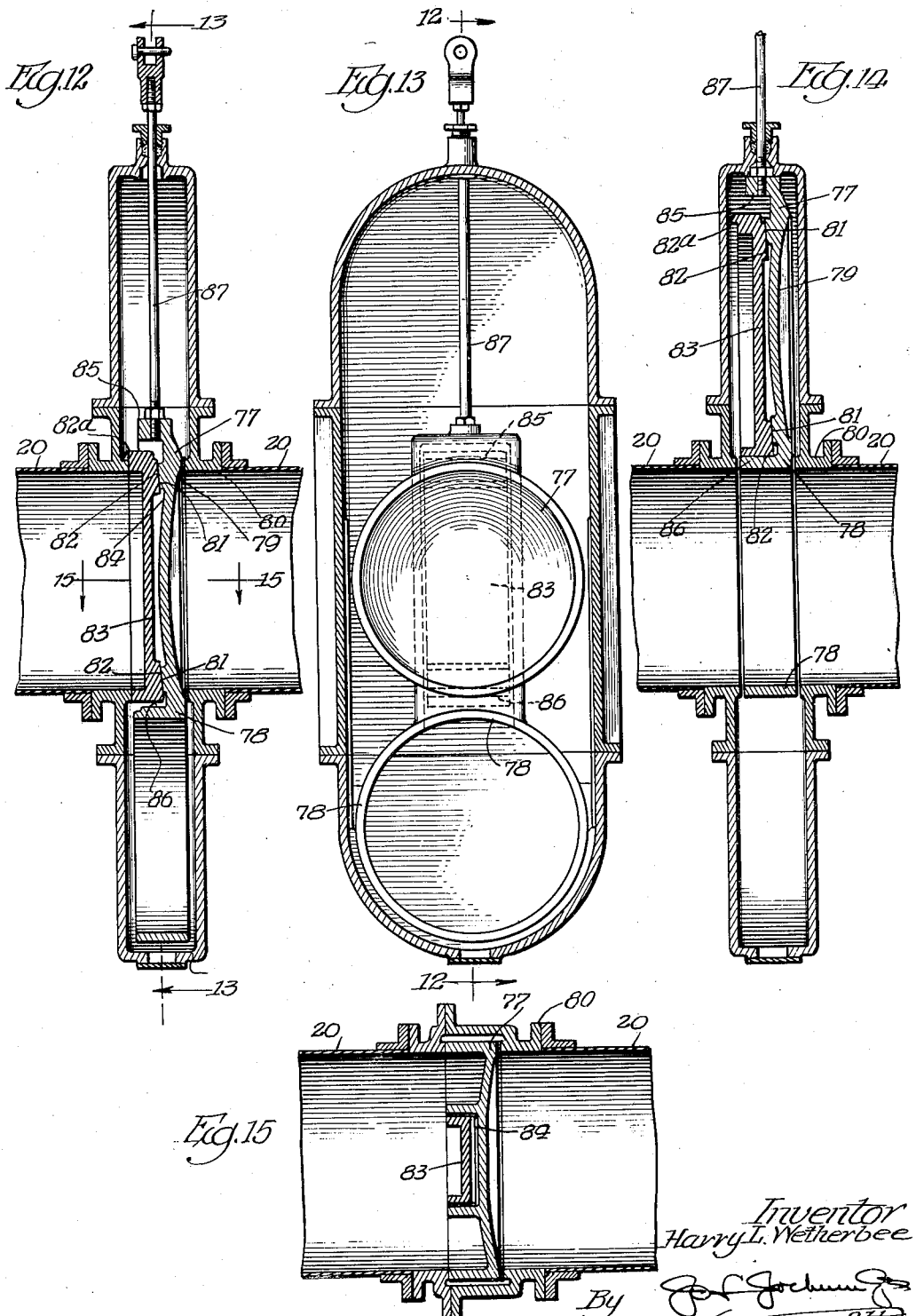

Patented Mar. 26, 1935

1,995,727

UNITED STATES PATENT OFFICE 1,995,727

VALVE FOR HOT GAS MAINS

Harry L. Wetherbee, Chicago, Ill., assignor to H. A. Brassert & Co., Chicago, Ill., a corporation of Illinois Application December 4, 1931, Serial No. 578,854

11 Claims. (Cl. 251—56)

In many places, principally in metallurgical processes, it is necessary to convey hot air or gas through mains and it is generally desired to keep this air or gas at as high a temperature as possible. To do this and to keep the gases from cooling more than is necessary, the mains are generally lined with brick or other insulating material.

Frequently the mains have to be closed to change the direction of, or to stop the flow of the air or gas, and for this purpose valves of some type must be used.

With the high temperatures now frequently used in metallurgical processes, a valve would lose much of its strength if left in direct contact with the hot gas and the valves, even with moderate temperatures, would warp and distort to such an extent that they would not close tightly, or, even at times this warping might be so great that the valves could not be operated.

Valves have been designed to be water cooled, but due to the extreme temperatures now used, this is not at all times satisfactory, and water cooling coming in contact with the gases tends to cool them, something which is to be avoided if possible.

It is one of the objects of the present invention to provide an improved gate type valve of such construction that the metal parts of the valve will be kept from contact with the heated gases, by means of insulation, both when the valve is closed and when it is open. Even with a thick insulation, enough heat may eventually reach the metal parts to cause them not to seat or operate properly, so water cooling is introduced, where necessary, to keep the metal parts at a proper temperature.

A further object is to provide in a valve of this character improved means for effecting a wedging action just as the valve is closed, so that the valve will be forced against its seat when closed, and will be immediately freed as soon as the valve starts to open, thus giving free operation right from the start.

A still further object of the invention is to provide in a valve of this character improved means whereby when the valve is open the body and an extension carried thereby will present a continuous, smooth and uniform diameter with the main for the passage of the air or gas.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a vertical, longitudinal sectional view of a portion of a main having a valve of this character constructed in accordance with the principles of this invention applied thereto and showing the valve in an open position.

Figure 2 is a view similar to Figure 1, showing the valve closed.

Figure 3 is a sectional view taken on line 3—3, Figure 2.

Figure 4 is a sectional view taken on line 4—4, Figure 2.

Figure 5 is a vertical, sectional view taken on line 5—5, Figure 6, of another form of valve, and showing the valve closed.

Figure 6 is a sectional view taken on line 6—6, Figure 5.

Figure 7 is a view similar to Figure 5, showing the valve in an open position.

Figure 8 is an sectional view taken on line 8—8, Figure 5.

Figure 9 is a vertical, sectional view taken on line 9—9, Figure 10, of another form of valve, showing the valve in a closed position.

Figure 10 is a sectional view taken on line 10—10, Figure 9.

Figure 11 is a view similar to Figure 10, with parts omitted, and showing the valve in an open position.

Figure 12 is a vertical, sectional view taken on line 12—12, Figure 13, of still another form of valve showing the valve in a closed position.

Figure 13 is a sectional view taken on line 13—13, Figure 12.

Figure 14 is a view similar to Figure 12, showing the valve in an open position.

Figure 15 is a sectional view taken on line 15—15, Figure 12.

Referring more particularly to the drawings and to the form of the invention shown in Figures 1 to 4, the numerals 20 designate sections of pipes or mains, through which the heated gases flow. These main sections are spaced from each other for reception therebetween of casing members 21, within which a valve operates, and these casing members 21 may be secured in position in any desired or suitable manner so that a valve designated generally by the reference numeral 22 may be reciprocated therebetween to be moved into an opening and closing position. This valve is of any desired suitable gate type and consists essentially of a body portion which is hollow as at 23, and the faces of the valve are provided with heat insulation 24—25, so as to prevent the heated gas from coming into contact with the metal parts of the valve.

The valve is adapted to be moved into an opening and closing position in any desired or suitable manner, not shown, and one face of the valve, preferably on the pressure side of the valve is provided with a recess 26 extending lengthwise thereof and preferably located adjacent the diametric center of the valve, the insulation 25 being arranged on each side of the recess 26. At the top of the recess a portion 27 of the body of the valve extends thereacross and a similar portion 27ᵃ extends across the lower end of the recess. The face of the body portion of the valve constituting the bottom of the recess is provided with inclined surfaces 28, any number of which may be provided, and disposed within the recess 26 is a wedge member 29 having inclined surfaces 30 adapted to cooperate with the respective inclined surfaces 28.

In the present form of this invention the inclined surfaces 30 as well as the inclined surfaces 28 are arranged adjacent the top and bottom of the wedge member. The wedge member 29 is preferably of a channel formation and heat insulating material 32 is arranged therein. This wedge member 29 is preferably of a length somewhat less than the length of the recess 26, for a purpose to be hereinafter set forth.

Carried by the valve member 22 is a tubular member 33 forming an extension of the valve and the extension 33 is of a size to be moved into the space occupied by the valve when the latter is moved out of a closing position and into the position shown in Figure 1.

The inner surface of the member 33 is provided with heat insulation 34 and may be lined by suitable lining such as brick 35. The interior surface of the mains 20 are also provided with heat insulation material 36 and lined with suitable brick lining 37. The diameter of the extension 33 is such that when the parts are moved in the position shown in Figure 1, the inner surface of the member will be substantially flush with the inner surface of the main so as to form a continuous surface and thereby obviate preventing obstructions to the flowing gas.

The body portion of the member 33 is hollow as at 38 and has communication with the hollow portion 23 of the body of the valve 22.

Depending below the main sections is a casing 39 formed in any desired or suitable manner and is of a size and configuration and is located beneath the space between the proximate ends of the adjacent main sections to receive the extension 33 when the valve is moved into a closing position.

The valve 22 with the extension 33 thereon may be operated to move the same into closing and opening positions in any desired or suitable manner.

Leading into the hollow portion 23 of the valve 22 is a pipe 40 which receives a supply of cooling fluid from any suitable source through a pipe 41 and the pipe 40 preferably extends for a considerable distance into the hollow portion 23 of the valve member. Another pipe 42 leads from the hollow portion 23 of the valve and connects with a discharge pipe 43. With this construction it will be manifest that cooling fluid may be supplied through the pipe 40 into the body portion of the valve 22 behind the insulated surfaces and as the extension 33 has communication with this hollow portion the cooling fluid will flow thereinto and a circulation will be maintained as the cooling fluid after passing through the valve and extension will flow out of the pipes 42—43.

In operation and with this form of valve and assuming the parts to be in the position shown in Figure 1, which is the open position of the valve, the wedge member 29 will be supported by the portion 27ᵃ at the lower end of the recess 26, and the inclined surfaces 30—28 will be displaced with respect to each other sufficiently to allow the body portion 22 and the wedge shaped member 29 to be laterally moved towards each other.

As the valve is lowered the wedge shaped member will be lowered with it and will continue to move with the body portion 22 until a shoulder 44 on the wedge member contacts with a shoulder 45 on the member 21 (see Figure 2) which will arrest the movement of the wedge member with the valve, but the valve may continue to move independently with respect to the wedge member. During this independent movement, the valve will be forced downwardly and the inclined surfaces 30—28 will move against and with respect to each other, causing the valve 22 to be wedged or forced laterally and upon its seat. When the valve is to be opened, it will move independently with respect to the wedge member 29 for a short distance and this will free the wedge member as well as the valve with respect to each other, thereby permitting the valve to move laterally and the wedge member to move laterally so that a free opening movement of the valve will be obtained. The valve 22 will continue to move independently with respect to the wedge member until the projection portion 27ᵃ of the valve member engages the bottom of the wedge member to raise the same to the position shown in Figure 1, and to move the valve together with the wedge member into a casing 21ᵃ arranged above the main sections and positioned to receive the valve and wedge member.

In the form of the invention shown in Figures 5 to 8, the wedge member 46 and the tubular extension member 47 are formed as a part of each other and the wedge member is hollow as at 48 and has communication with a hollow portion 49 of the extension 47, cooling fluid being directed into the wedge member and the tubular member 47 by means of the supply pipe 50, receiving its supply from a suitable source through a pipe 51. The cooling fluid will flow out of the wedge member and the tubular member 47 through an outlet 52 which preferably encompasses the supply pipe 50 and will be discharged through a head 53 to which is connected a discharge pipe 54.

In this form of the invention the valve 55 is separate from the extension and from the wedge member 46 and is hollow as at 56 so that cooling fluid may be supplied through a pipe 57 and discharged through a pipe 58.

The inclined surfaces 59 carried by the valve member co-operate with inclined surfaces 60 carried by the wedge member so as to cause the two to be forced against their seats during the closing movement of the valve and to move with respect to each other into positions as to allow the valve 55 and wedge member 46 to be moved towards each other to effect a free and easy opening of the valve.

The active face of the valve member with respect to the main is heat insulated as at 61 and the active face of the wedge member is heat insulated as at 62.

This form of valve operates in the same manner as the form shown in Figures 1 to 4, with respect to its opening and closing movements, that is during its opening movement the valve and wedge member will move upwardly into a casing 55ª, and during the closing movements of the valve the extension 47 will be lowered into a casing 55ᵇ.

In the form of the invention shown in Figures 9 to 11, the wedge member is dispensed with and the valve proper 63 is hollow and is tapered so as to be forced into a tapered opening formed between the proximate ends of the main sections 64. A tubular extension 65 is connected with the valve 63 and is also hollow as at 66. Both faces of the valve 63 are heat insulated as at 67 and the extension 65 is also heat insulated as at 68 and preferably lined as at 69.

Cooling fluid is supplied to the body of the valve 63 through a supply pipe 70 from a suitable source through a pipe 71, and which pipe 70 extends for a considerable distance into the body of the valve. An outlet pipe 72 encompasses the supply pipe 70 and leads from the hollow portion of the valve 63 to a head 73 from which a discharge pipe 74 leads so that the cooling fluid when supplied through the pipe 70 will circulate through the body of the valve 63 and the extension 68 to be discharged out of the pipes 72—74.

In this form of the invention, it will be noted that the valve constitutes a double seat and by reason of its shape, the wedge member may be dispensed with, yet the valve together with the extension will be water cooled and heat insulated. The extension or member 68 moves into a casing 75 which depends below the main sections 64 as the valve is moved into a closing position and as the valve is moved into an opening position or into the position shown in Figure 11, the valve will move into a casing 76 which projects above the main sections 64 and arranged in a position to receive the valve.

In the form of the invention shown in Figures 12 to 15, another form of valve is shown in which the valve and wedge member are of solid formation and heat insulation is dispensed with and the valve member 77 is solid having the tubular extension 78 formed integrally therewith. The valve is provided with surfaces 79 adapted to be seated against the casing members 80 when the valve is in a closing position. Wedge shaped surfaces 81 are provided on the rear face of the valve member 77 with which wedge surfaces 82 on the back of the wedge member 83 co-operate. This wedge member 83 operates in the recess 84 on the rear surface of the valve member 77 and projections 85—86 are respectively arranged at the top and bottom of the recess so as to effect a movement of the wedge member 83 with the valve member 77 during closing and opening movements of the valve. A shoulder 82ª on the wedge member 83 is adapted to engage a fixed stop to cause a relative movement of the elements 83 and 79 one with respect to the other.

The valve member 77 is adapted to be moved in any desired or suitable manner through the medium of an operating rod 87.

When the valve is opened the extension 78 will move into a position between the proximate ends of the adjacent main sections so that the inner surface thereof will be substantially flush with the inner surfaces of the main section and thereby obviate the formation of any shoulders which would act as obstructions to the flow of the gases.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. In combination a main, a gate valve movable into and out of position to respectively close and open said main, a tubular member movable into the space occupied by the valve when the latter is moved to a position to open the main, to cause the inner surface of said member to be flush with the inner surface of the main, the surface of the valve and the inner surface of said member being heat insulated, a wedge member separate from said valve and operating to force the valve against its seat, and means whereby a cooling fluid may be circulated through the body of said wedge member, said wedge and said valve being one responsive in its operation to the operation of the other.

2. In combination a main, a valve member movable into and out of position to respectively close and open said main, a tubular element movable into and substantially filling the space occupied by the member when the latter is moved to a position to open the main, to cause the inner surface of said element to be flush with the inner surface of the main, the surface of the valve member and the inner surface of said element being heat insulated, a wedge member separate from said valve member and operating to force the valve member against its seat, and means whereby a cooling fluid may be circulated through the body of said wedge member, said tubular element being connected to one of said members only.

3. In combination a main, a gate valve member movable into and out of position to respectively close and open said main, a tubular extension carried by the valve member only and movable into and substantially filling the space occupied by the valve member when the latter is moved into a position to open the main, said valve member and extension being heat insulated, means whereby a cooling fluid may be circulated through the body of the valve member and said extension, and a wedge member separate from the valve member and operating to force the latter upon its seat.

4. In combination with a main, a valve member movable into and out of position to respectively open and close said main, a wedge member separate from the valve member and operating to force the valve member upon its seat, a tubular extension element carried with only one of said members and movable into and substantially filling the space occupied by the valve member when the latter is moved into a position to open the main, said valve and said extension element being heat insulated, and means whereby cooling fluid may be circulated through the wedge member.

5. In combination a main, a valve member movable into and out of position to respectively close and open said main, a tubular element movable into and substantially filling the space occupied by the valve member when the latter is moved into a position to open the main, said valve member and extension being heat insulated, means whereby cooling fluid may be circulated through the body of the valve member and said extension, and a wedge member separate from the valve member and operating to force the latter upon its seat, said extension being connected to and forming a part of one of said members only.

6. In combination a main, a gate movable into and out of position to respectively close and open said main, a tubular member movable into the space previously occupied by the gate when the latter is moved into a position to open the main, and having an uninterrupted inner surface, and a wedge member remote from said tubular member, said wedge member and gate being movable together into opening and closing positions with respect to the main, one being subsequently movable with respect to the other to effect a wedging action upon the gate when the latter is in a position to close the main.

7. In combination a main, a gate movable into and out of position to respectively close and open said main, a tubular member movable into the space previously occupied by the gate when the latter is moved into a position to open the main and having an uninterrupted inner surface, and wedging means, said wedging means and gate being movable together into opening and closing positions with respect to the main, and means for causing said wedging means to effect a wedging action upon the gate when the latter is in a position to close the main, said wedging means and said gate being also movable one in advance of the other during the operation to effect an opening of the main, said wedging means being independent of said tubular member.

8. In combination a main, a gate movable into and out of position to respectively close and open said main, a tubular member movable into the space previously occupied by the gate when the latter is moved into a position to open the main, a wedge member, said wedge member and gate constituting a unit, said wedge member and gate being movable together into opening and closing positions with respect to the main, means carried by one of the members of said unit for engagement with the main to effect a subsequent relative movement of one of the members of said unit to cause a wedging action upon the gate when the latter is in a position to close the main, and means whereby a cooling fluid may be circulated through the body of the gate.

9. In combination a main, a gate movable into and out of position to respectively close and open said main, a tubular member movable into the space previously occupied by the gate when the latter is moved into a position to open the main and having an uninterrupted inner surface, and a wedge member, said wedge member and gate being movable together into opening and closing positions with respect to the main, means separate with respect to and remote from said tubular member to cause said wedge member and gate to be moved one with respect to the other to effect a wedging action upon the gate when the latter is in a position to close the main, said tubular member forming an extension of the said gate.

10. In combination a main, a valve member movable into and out of position to respectively close and open said main, a tubular element movable into and substantially filling the space previously occupied by the valve member when the latter is moved into a position to open the main, a wedge member, said wedge member and valve member being movable together into opening and closing positions with respect to the main, one being subsequently movable with respect to the other to effect a wedging action upon the valve member when the latter is in a position to close the main, said valve member and said tubular element being heat insulated, and means whereby cooling fluid may be circulated through the bodies of said wedge and said gate members, said element being connected to one of said members only.

11. In combination a main, a valve member movable into and out of position to respectively close and open said main, a tubular element movable into and substantially filling the space previously occupied by the valve member when the latter is moved into a position to open the main, a wedge member, said wedge member and valve member being movable together into opening and closing positions with respect to the main, one being subsequently movable with respect to the other to effect a wedging action upon the valve member when the latter is in a position to close the main, said valve member, said tubular element and said wedge element being heat insulated, and means whereby cooling fluid may be circulated through said valve member, and wedge member and tubular element, said element being connected to one of said members only.

HARRY L. WETHERBEE.